(12) United States Patent
Liang

(10) Patent No.: US 11,492,105 B2
(45) Date of Patent: Nov. 8, 2022

(54) ARROWHEAD AIRCRAFT

(71) Applicant: Rue-Lan Liang, Anaheim, CA (US)

(72) Inventor: Rue-Lan Liang, Anaheim, CA (US)

(*) Notice: Subject to any disclaimer, the term of this patent is extended or adjusted under 35 U.S.C. 154(b) by 142 days.

(21) Appl. No.: 17/090,784

(22) Filed: Nov. 5, 2020

(65) Prior Publication Data

US 2022/0135216 A1 May 5, 2022

(51) Int. Cl.
*B64C 29/00* (2006.01)
*B64C 11/48* (2006.01)
*F02K 1/34* (2006.01)
*B64C 11/00* (2006.01)
*B64C 13/04* (2006.01)

(52) U.S. Cl.
CPC ........ *B64C 29/0025* (2013.01); *B64C 11/001* (2013.01); *B64C 11/48* (2013.01); *B64D 33/06* (2013.01); *B64C 13/042* (2018.01)

(58) Field of Classification Search
CPC ... B64C 29/0025; B64C 11/001; B64C 11/48; B64C 2230/14; B64C 39/001; B64C 39/029; B64C 39/06; B64C 21/02; B64C 21/025; B64C 21/04; B64C 21/06; B64D 33/06; B64D 2033/0206; B64D 2033/024; B64D 27/24; B64D 35/06; B64D 35/00; B64D 35/02; B64D 35/04; F02K 1/34; F02C 3/305; F05D 2260/212
See application file for complete search history.

(56) References Cited

U.S. PATENT DOCUMENTS

| | | | | |
|---|---|---|---|---|
| 4,077,202 A | * | 3/1978 | Schutze | F02N 7/12 60/788 |
| 4,605,185 A | * | 8/1986 | Reyes | B64D 35/00 244/58 |
| 4,666,104 A | * | 5/1987 | Keiber | B64C 21/06 244/209 |
| 5,149,012 A | * | 9/1992 | Valverde | B64C 29/0025 244/12.3 |
| 6,561,456 B1 | * | 5/2003 | Devine | B64C 29/0025 244/12.3 |
| 2006/0219847 A1 | * | 10/2006 | Miller | B64C 23/00 244/130 |
| 2008/0078159 A1 | * | 4/2008 | Thomas | F02K 1/46 60/770 |

(Continued)

*Primary Examiner* — Joshua J Michener
*Assistant Examiner* — Cindi M Curry
(74) *Attorney, Agent, or Firm* — Chun-Ming Shih; HDLS IPR Services

(57) ABSTRACT

An arrowhead aircraft includes a pair of counter-rotating propellers, a jet engine module, and an exhausted module, wherein the counter-rotating propellers propel the aircraft but does not have angular momentum, and the exhausted module deployed around the exhausted end of the jet engine module, which reuses the waste heat from the exhausted end and reduces the noise. Wherein, the airflow system includes a shutter deployed at the bottom side of the body that controls the streamlines of airflow through the aircraft and a plurality of airfoils that will force the aircraft tilted to the desired direction. The present invention resolved the helicopter's vulnerabilities, such as its intricate mechanism, dragging response, dangers blades, hard to control angular momentum, high cost, and high training level.

11 Claims, 14 Drawing Sheets

(56) References Cited

U.S. PATENT DOCUMENTS

| | | | |
|---|---|---|---|
| 2011/0284684 A1* | 11/2011 | Amraly | B64C 11/001 244/12.4 |
| 2015/0191250 A1* | 7/2015 | DeVita | B64C 27/12 701/3 |
| 2015/0203089 A1* | 7/2015 | Mahajan | B64C 39/001 180/120 |
| 2016/0207624 A1* | 7/2016 | Hymer | B64D 27/18 |

* cited by examiner

ARROWHEAD AIRCRAFT

BACKGROUND OF THE INVENTION

Field of the Invention

The present invention generally relates to aircraft, in particular, to an aircraft, which is an arrowhead in shape and comprising a heat recovery module that reused the heat from the exhausted end.

Description of the Prior Art

Benefits of the high propulsion efficiency and the ability of vertical take-off and landing, the helicopter has been the most popular choice in short-haul aircraft and rescue. However, the helicopter has vulnerabilities, such as its intricate mechanism, dragging response, dangers blades, hard to control angular momentum, high cost, and high training level. As a result, general consumers would not adopt a helicopter in its garage but rent a helicopter with a pilot to take short-haul travel. Accordingly, what is needed is a lower price aircraft that is easy to pilot and parks in a two-car garage.

SUMMARY OF THE INVENTION

The present invention is an aircraft comprising an arrowhead-shaped body, a propulsion system, and an airflow system, wherein the propulsion system comprises a rotor module, a jet engine module, and an exhausted module. Wherein, the rotor module comprises a pair of counter-rotating propellers which connected with the jet engine module, and the exhausted module deployed around the exhausted end of the jet engine module, which reuses the waste heat from the exhausted end and reduces the noise. Wherein, the airflow system comprises a shutter deployed at the bottom side of the body that controls the streamlines of airflow through the aircraft by changing the angle of the shutter's blades, and a plurality of airfoils that will force the aircraft tilted to the desired directions.

The propulsion system further comprises a motor, a first gear module, a second gear module, and an ignition module, wherein the ignition module comprises a permanent magnet, a coil unit and a spark plug, wherein the permanent magnet is deployed on the first gear module, the spark plug is deployed on the jets engine module, and the spark plug is connected with the coil unit. When the pilot is ready to take off, the motor rotates in a clockwise direction, and then the motor engaged with the first gear module to rotate the compressor which compresses the intake air and triggers the spark plug by the ignition module to start the combustion of the jet engine module. When the jet engine module being abnormal, the motor rotates in a counter-clockwise direction and the second gear module will transfer the motion of the motor to the horizon shaft, which allows the aircraft to have an emergence landing.

The present invention is a safe, versatile, affordable flying machine. It can be parked in a two-car garage, towed by a trailer, and can be a lifesaving gadget of our time. The present invention resolved the helicopter's vulnerabilities, such as its intricate mechanism, dragging response, dangers blades, hard to control angular momentum, high cost, and high level of training. The present invention has the merit of low engine noise, simple mechanism, aerodynamic shape, easy learning and piloting. It can take off and land at the location that other aircraft cannot, and it is possible to be equipped with rescue gadgets to save lives.

BRIEF DESCRIPTION OF THE DRAWINGS

The techniques of present invention would be more understandable from the detailed description given herein below and the accompanying figures are provided for better illustration, and thus description and figures are not limitative for present invention, and wherein.

DETAILED DESCRIPTION OF THE INVENTION

Figure 1:
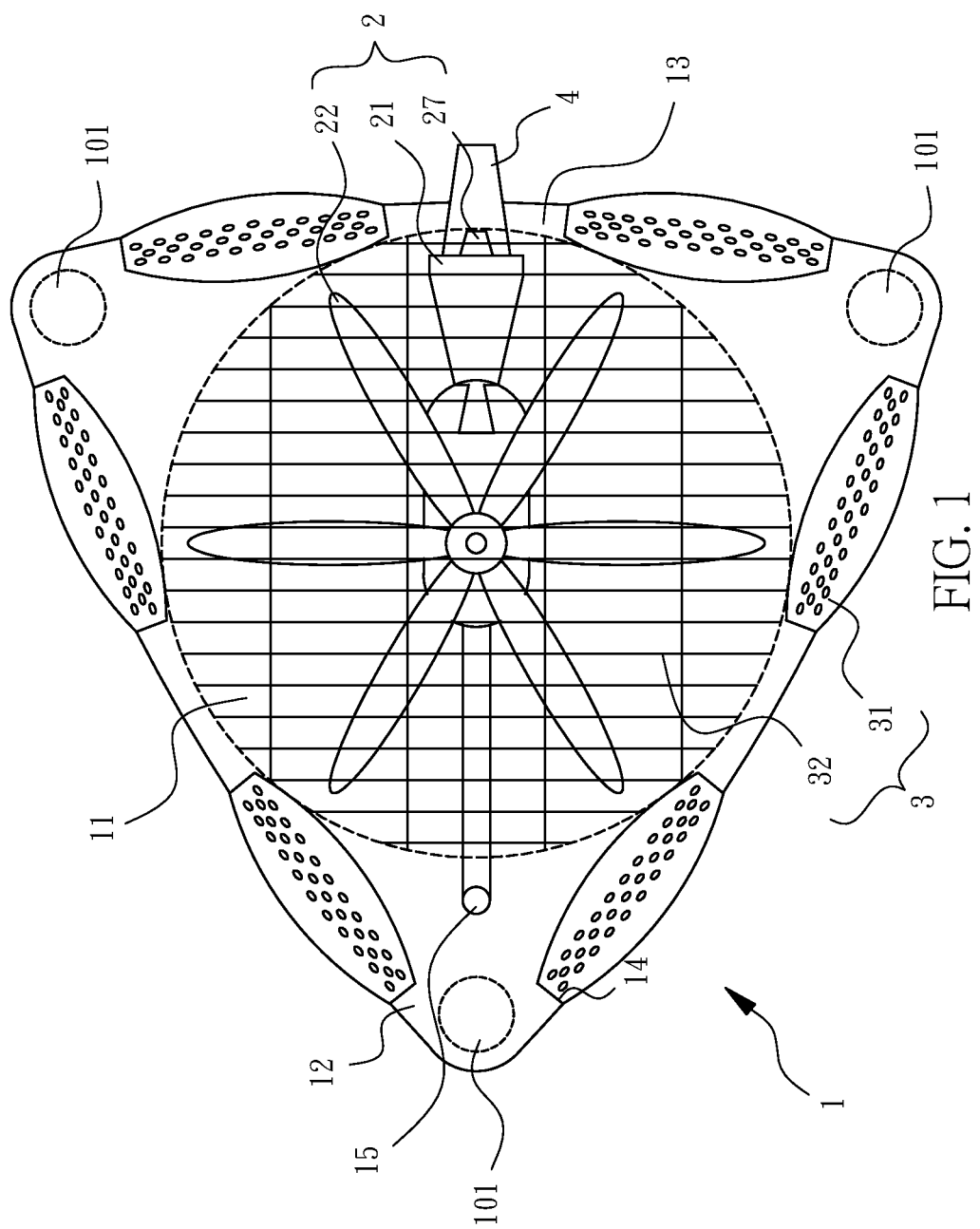
FIG. 1 shows a bottom view of the aircraft.
Figure 2:
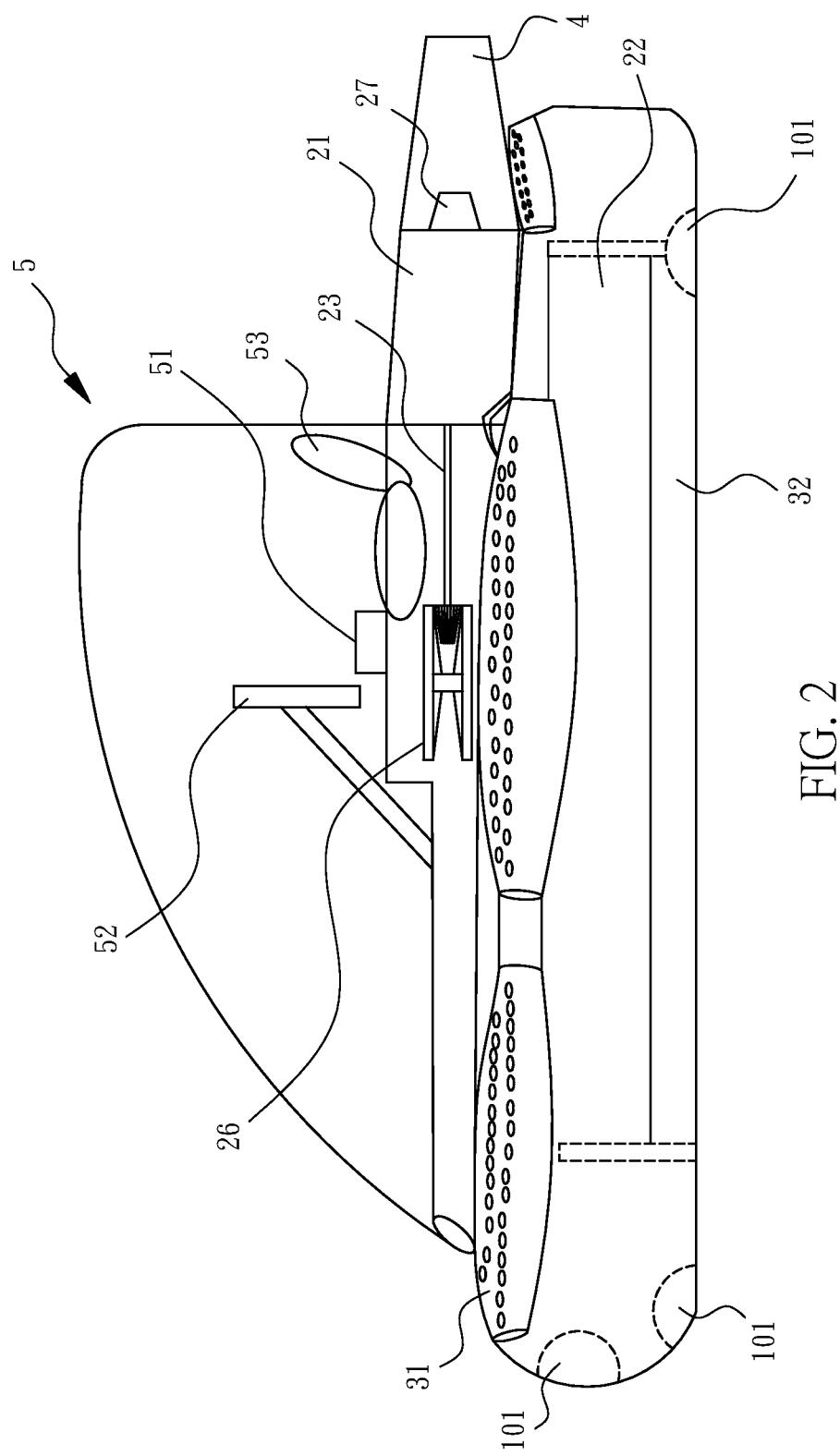
FIG. 2 shows a side view of the aircraft.

As shown in FIGS. 1 and 2, the present invention discloses an aircraft comprising a body 1, a propulsion system 2, and an airflow system 3, wherein the body 1 comprises a recess 11 at the center of the gravity of the body, a nose 12 at the front end of the body, a tail side 13 at the back end of the body, six cavities 14 disposed along the three lateral sides of the body, wherein the lateral sides of the body are equal and having a length of 3 meters. The body 1 furthers comprising plurality of lights 101 which spread at the nose 12 and the tail side 13.

In the present invention, the propulsion system 2 comprising a jet engine module 21 deployed at the tail side 13, a rotor module 22 deployed at the recess 11. And, an air intake duct 15 is disposed between the jet engine module 21 and the nose end 12, which allows the intake air to pass to the jet engine module 21 from the nose end 12.

In the present invention, the jet engine module 21 comprising an exhausted end 27, which is an exhaust pipe, and an exhausted module 4 deployed around the exhausted end 27, which is installed to reduce the noise and reuse the waste heat from the jet engine module 21.

In the present invention, the airflow system 3 comprising six airfoils 31 and a shutter 32, wherein the shutter 32 is deployed at the bottom side of the body and covered the recess 11, and the six airfoils 31 are deployed in the cavities 14, respectively. The combination of the six airfoils 31 and the shutter 32 enabled the pilot to control the streamlines of the airflow through the recess 11, and determined the aircraft's motion.

In the present invention, the aircraft comprising a cockpit 5 deployed on the top of the body 1, wherein the cockpit 5 comprises a flying control box 51, a control panel 52, and an accelerator, wherein the accelerator is connected with the propulsion system 2 which is configured to control rotational speed of the propulsion system 2, wherein the control panel 52 is configured to control the electronic units installed on the body. The electronic units are GPS devices, autopilot devices, camera devices, compasses, ground search lights, air control radios, water tank gauges, fuel tank gauges, speed gauges, radar systems, engine failure alerts, temperature gauges, altitude gauges, ignition switches and so on. Wherein, the flying control box 51 is connected with the six airfoils 31 and shutter 32, which is configured to determine the aircraft's direction.

In the present invention, the cockpit 5 further comprises a pilot seat 53, and the cockpit 5 having a width of 2 meters. Wherein, the total height of the present invention is 1.8 meters.

Figure 3:
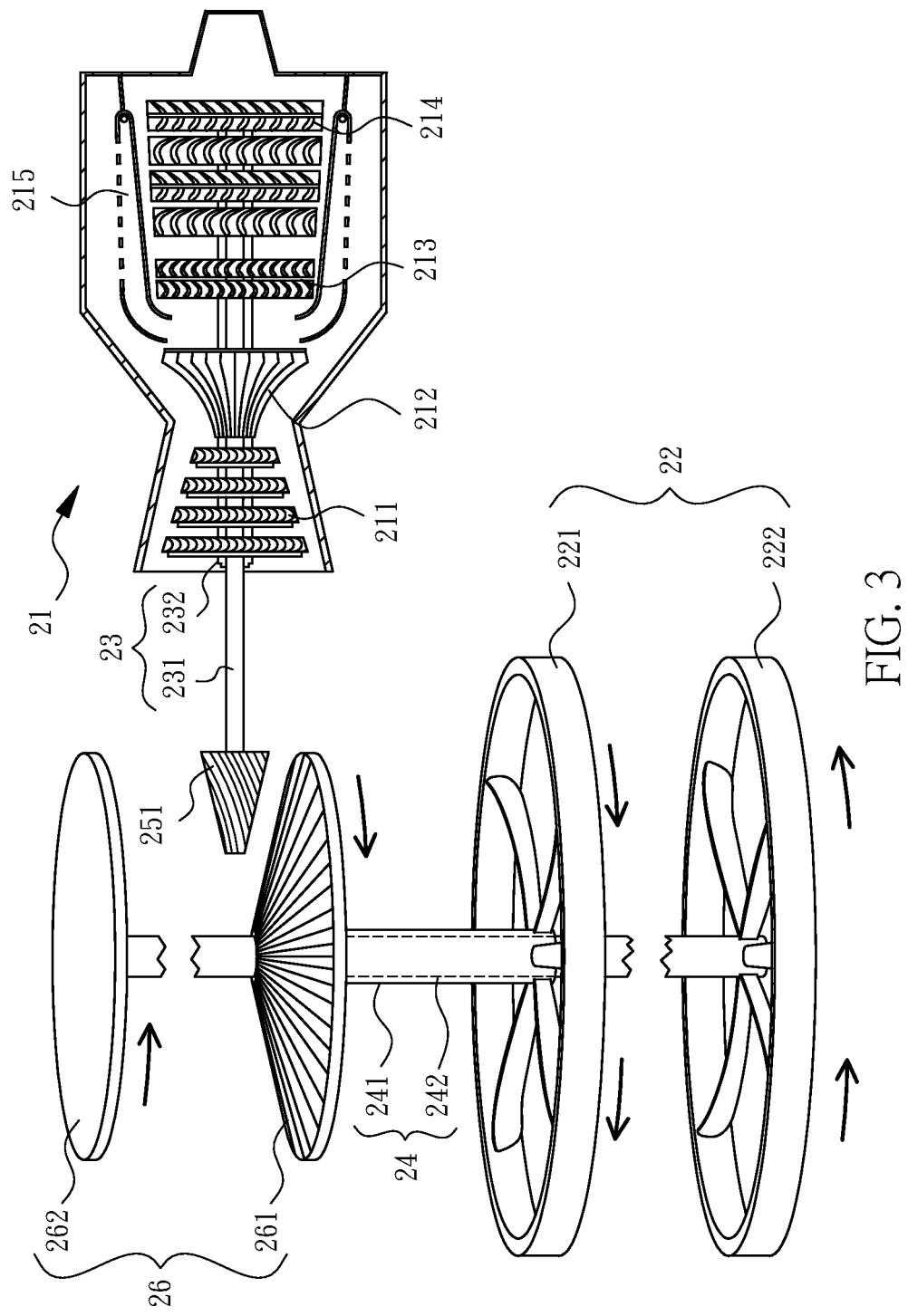
FIG. 3 shows a cross-sectional view of the jet engine module and the rotor module.

As shown in FIG. 3, the propulsion system 2 comprises the jets engine module 21 and the rotor module 22. The rotor module 22 connected with a vertical shaft 24 while the jet engine module 21 connected with a horizon shaft 23; the horizon shaft 23 and the vertical shaft 24 are engaged with each other by a bevel gear module 26 and first bevel gear unit 251. The rotor module 22 comprises a pair of counter-rotating propellers including first propeller 221 and second propeller 222, the counter-rotating propellers are mounted on the vertical shaft 24, while the bevel gear module 26 comprises the second bevel gear unit 261 and third bevel gear unit 262.

In the present invention, the horizon shaft 23 and the vertical shaft 24 are both coaxial shaft, wherein the horizon shaft 23 comprises a horizon inner shaft 231 and a horizon outer shaft 232, and the horizon inner shaft 231 deployed inside the horizon outer shaft 232. Likewise, the vertical shaft 24 further comprises a vertical outer shaft 241 and a vertical inner shaft 242; the vertical inner shaft 242 deployed inside the vertical outer shaft 241. The vertical outer shaft 241 engaged with the second bevel gear unit 261 and the first propeller 221, while the vertical inner shaft 242 engaged with the third bevel gear unit 262 and the second propeller 222.

The jets engine module 21 is a turbo shaft engine having a specification which is 214 HP, 14 L/100 Km, 82 Kg weight, 6000 RPM, 33 inches length, 16 inches width, 1000 Kg lifting capability, in an embodiment of the present invention, the jets engine module 21 is "Turboshaft Engine PBS TS100" or an equivalent. The jets engine module 21 comprises a compressor 211, a centrifugal disk 212, a gas turbine 213, a power turbine 214, and a burner 215. The horizon inner shaft 231 engaged with the bevel gear module 26 in one end and engaged with the power turbine 214 in the other end, while the horizon outer shaft 232 engaged with the compressor 211, centrifugal disk 212, and gas turbine 213.

When the jets engine module 21 is started, the compressor 211 and the centrifugal disk 212 intake and heat the air through the burner 215 which produce thrust power to the gas turbine 213 and the power turbine 214, wherein the thrust power forces the gas turbine 213 and the power turbine 214 to rotate in a opposite direction. And the power turbine 214 turned the horizon inner shaft 231 which force the counter-rotating propellers of the rotor module 22 rotating in opposite direction, and then the gas turbine 213 will keep the continuous rotation of the compressor 211 and the centrifugal disk 212. The design of the counter-rotating propellers will countervail the angular momentum of the propeller.

Figure 4:
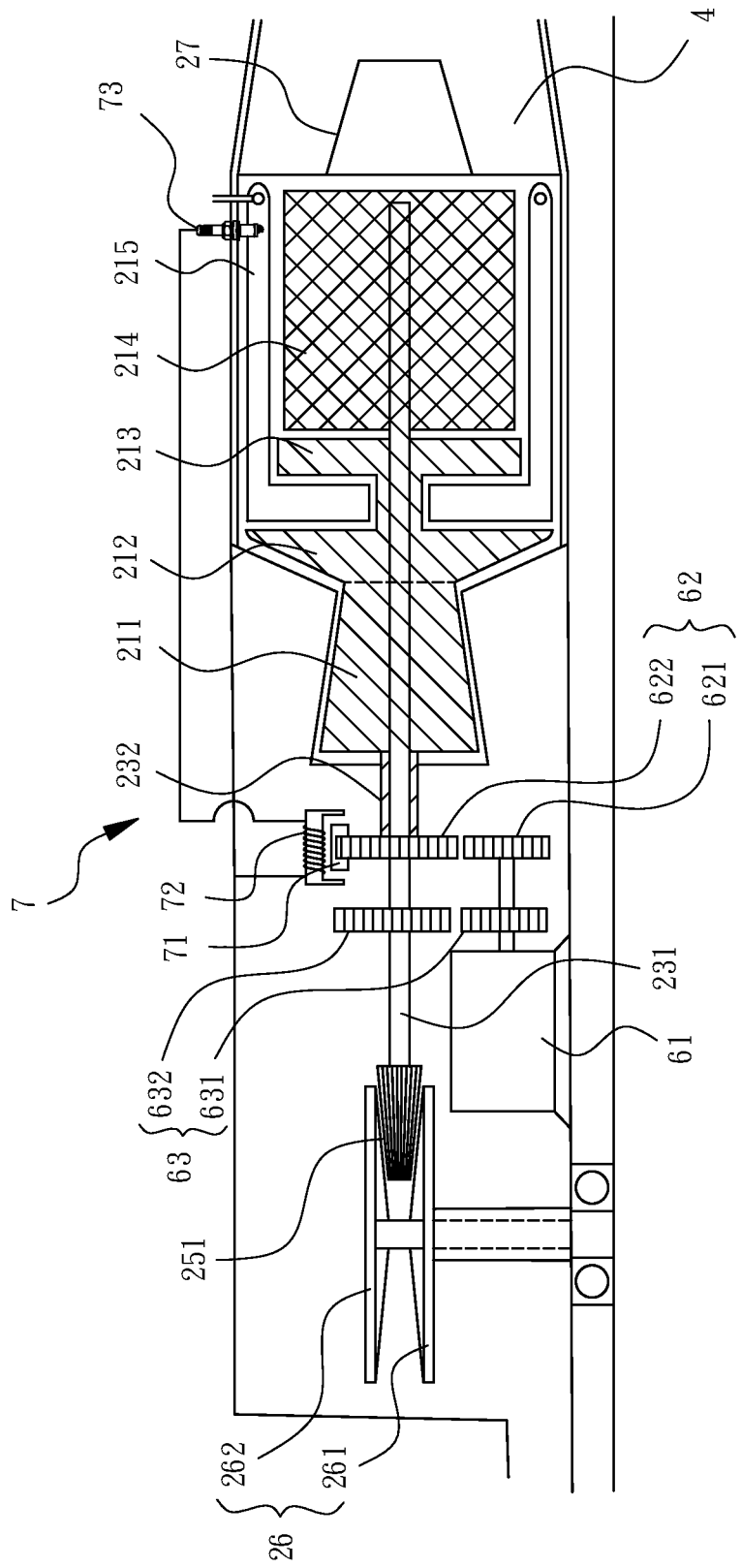
FIG. 4 shows a cross-sectional view of the jet engine module.
Figure 5:
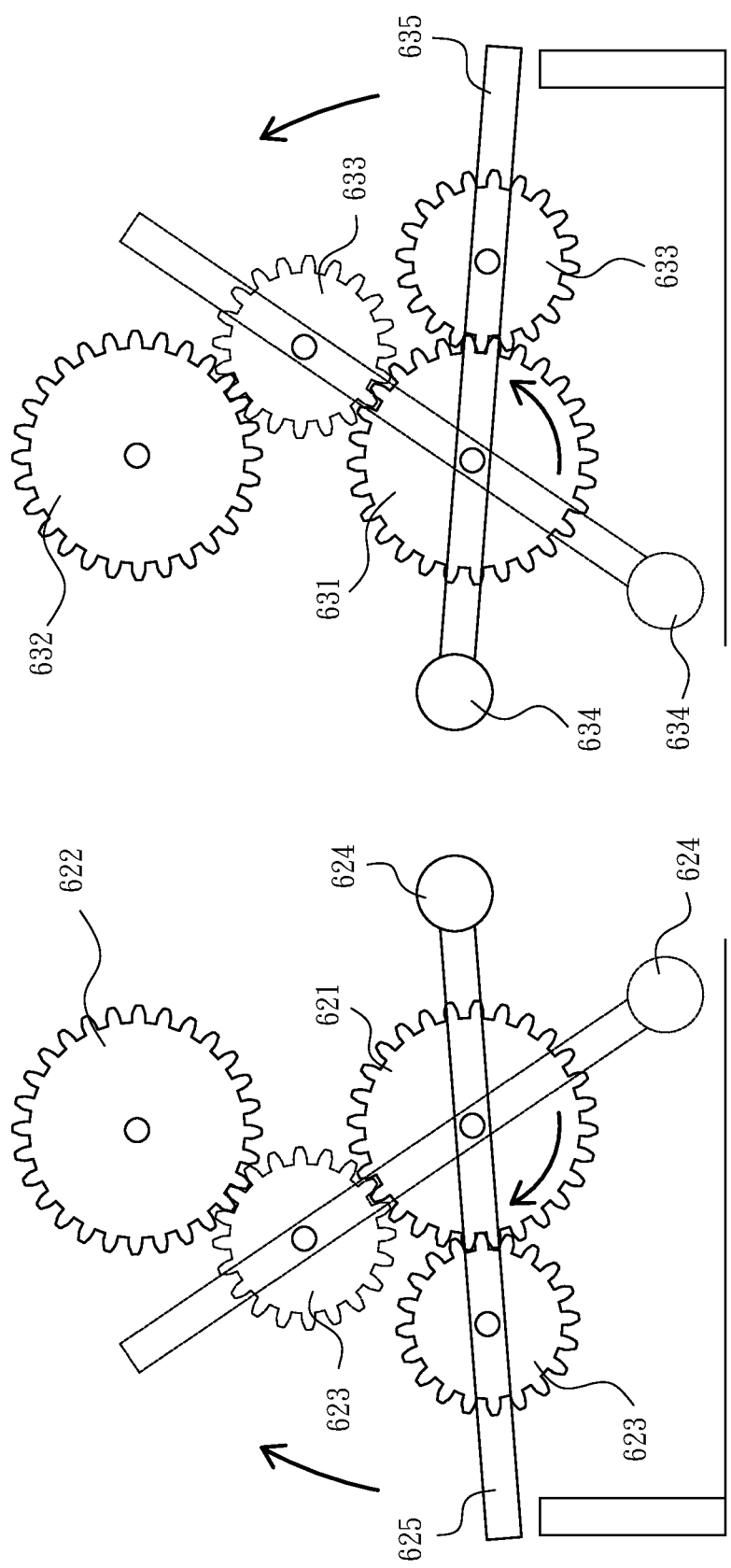
FIG. 5 shows a cross-sectional view of the first gear module and the second gear module.

As shown in FIGS. 4 and 5, the propulsion system 2 further comprising a motor 61, a first gear module 62, second gear module 63, and an ignition module 7, wherein the ignition module 7 comprises a permanent magnet 71, a coil unit 72, and a spark plug 73, wherein the permanent magnet 71 is deployed on the first gear module 62, and the spark plug 73 connected with the coil unit 72, wherein the spark plug 73 is deployed on the jets engine module 21.

In the present invention, the first gear module 62 comprises a first motor gear 621, a first shaft gear 622, a first transition gear 623, and a first counterweight 624. The motor gear 621 engaged with the first transition gear 623, the motor 61 connected with the first motor gear 621, the horizon outer shaft 232 connected with the first shaft gear 622, the first counterweight 624 connected with the first motor gear 621 and the first transition gear 623 by a first lever 625. When pilot is going to start the jets engine module 21, the pilot turned on the motor 61 to rotate in a clockwise direction, the first motor gear 621 also rotates in a clockwise direction which lifts the first transition gear 623 up, and the first transition gear 623 make the first shaft gear 622 to be engaged with the first motor gear 621, then the motion of the motor 61 being transfer to the horizon outer shaft 232 which rotates compressor 211, and simultaneously the motion also transfer to the ignition module 7 which is deployed on the first shaft gear 622, then the ignition module 7 transform the motion into energy to ignite the combustion of the jets engine module 21. After the jets engine module 21 is started, the motor 61 will also stop the rotation, which brings separation of the first transition gear 623 and the first shaft gear 622.

In the present invention, the second gear module 63 comprises a second motor gear 631, a second shaft gear 632, a second transition gear 633, and a second counterweight 634. The motor gear 631 engaged with the second transition gear 633, the motor 61 engaged with the second motor gear 631, the horizon inner shaft 231 engaged with the second shaft gear 632, the second counterweight 634 engaged with the second motor gear 631, and the second transition gear 633 by a second lever 635, when an engine failure alert detects the abnormal of the jet engine module 21, and trigger the motor 61 rotates in a counter-clockwise direction, which force the second motor gear 631 also rotates in a counter-clockwise direction which lifts the second transition gear 633 up, and the second transition gear 633 make the second shaft gear 632 to be engaged with the second motor gear 631, then the motion of the motor being transfer to the horizon shaft which allows the aircraft to have an emergency landing.

Figure 6:
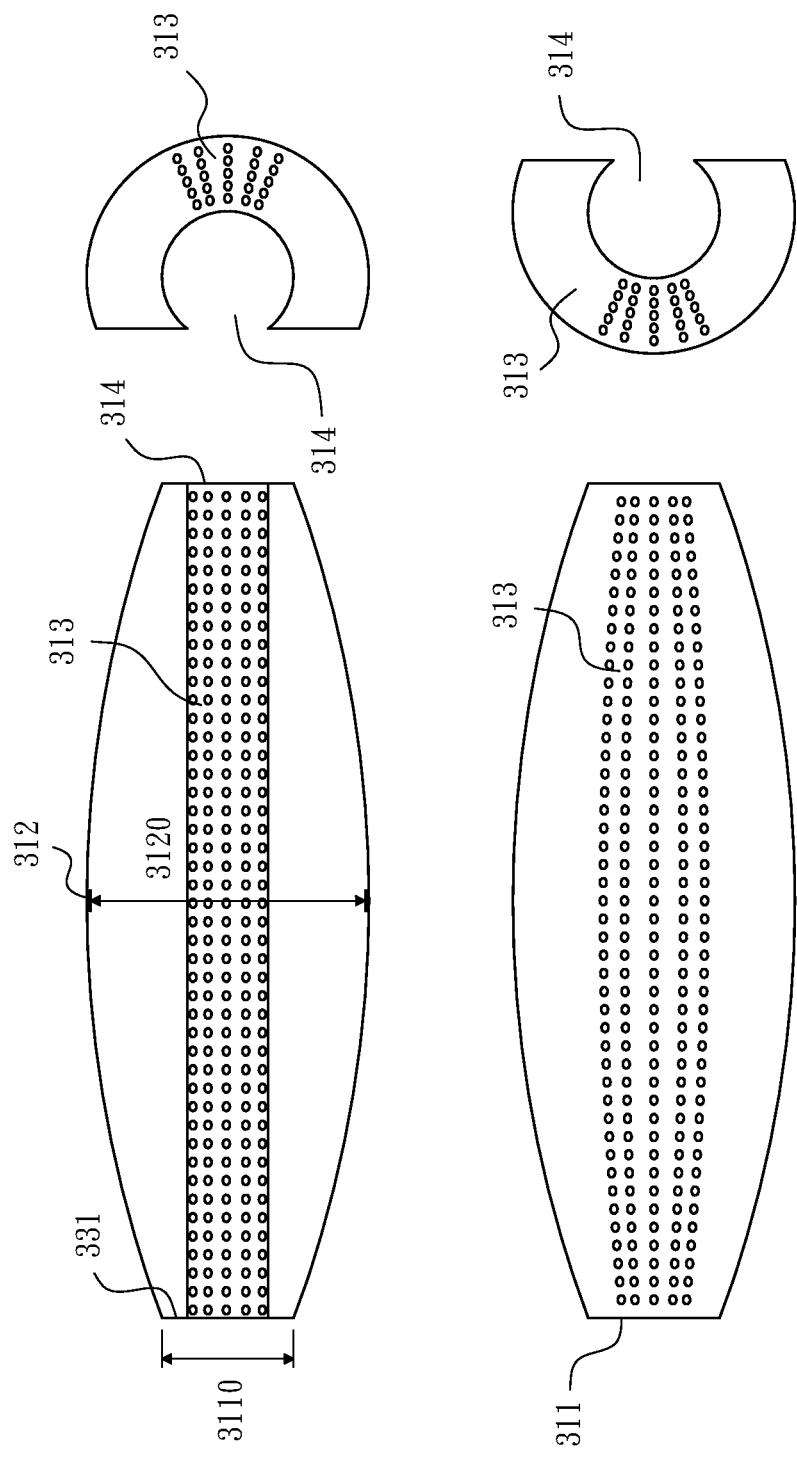
FIG. 6 shows a cross-sectional view of the airfoil.

As shown in FIG. 6, the airfoils 31 is a hollow column in shape, and the end diameter 3110 of the ends 311 is smaller than the middle diameter 3120 of the middle 312, and the pore part 313 is along the airfoil from one end 311 to the other on one side. An opening 314 is formed by cutting off the opposite side of the pore part 313.

Figure 7:
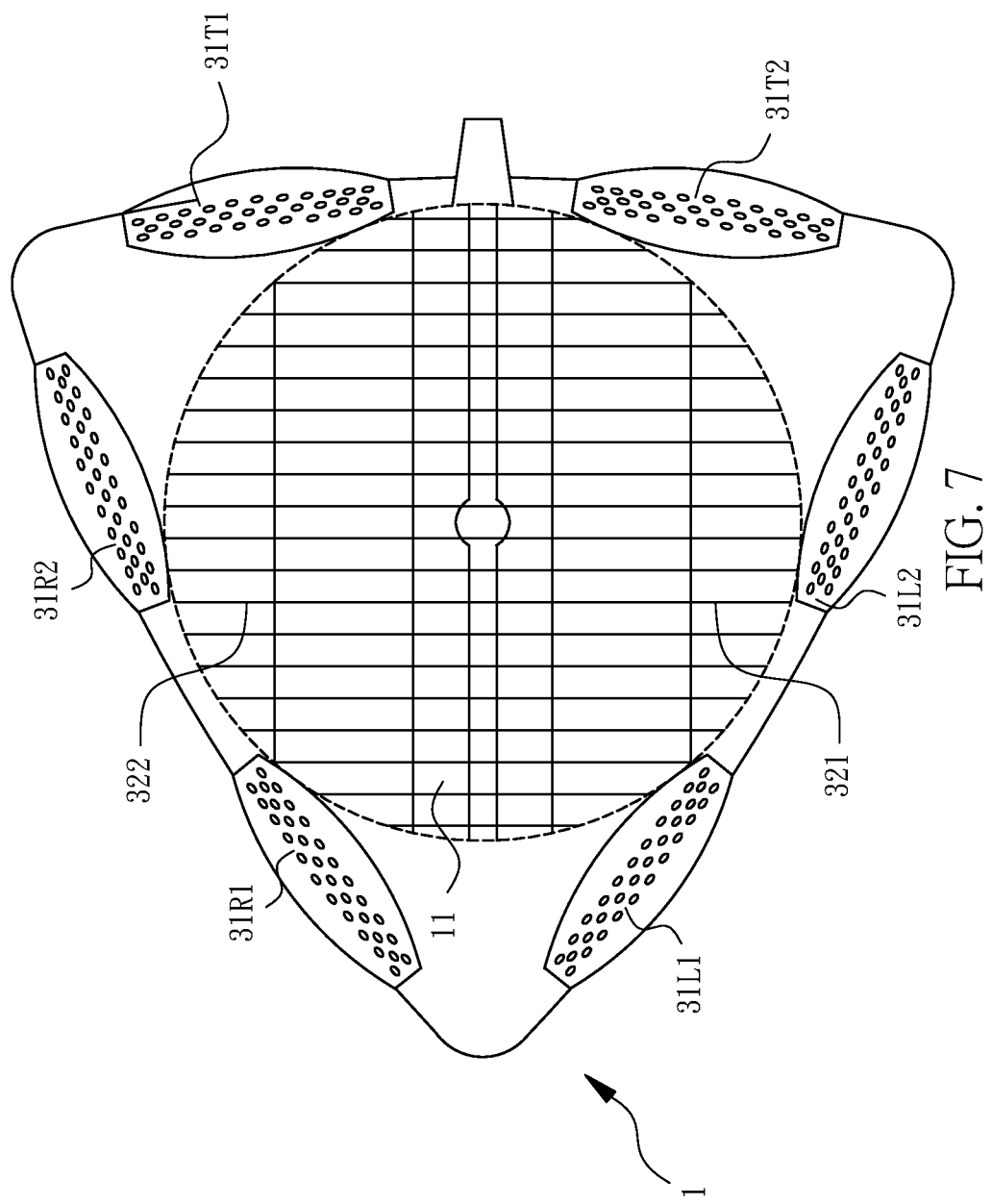
FIG. 7 shows a bottom view of the airflow system.
Figure 8:
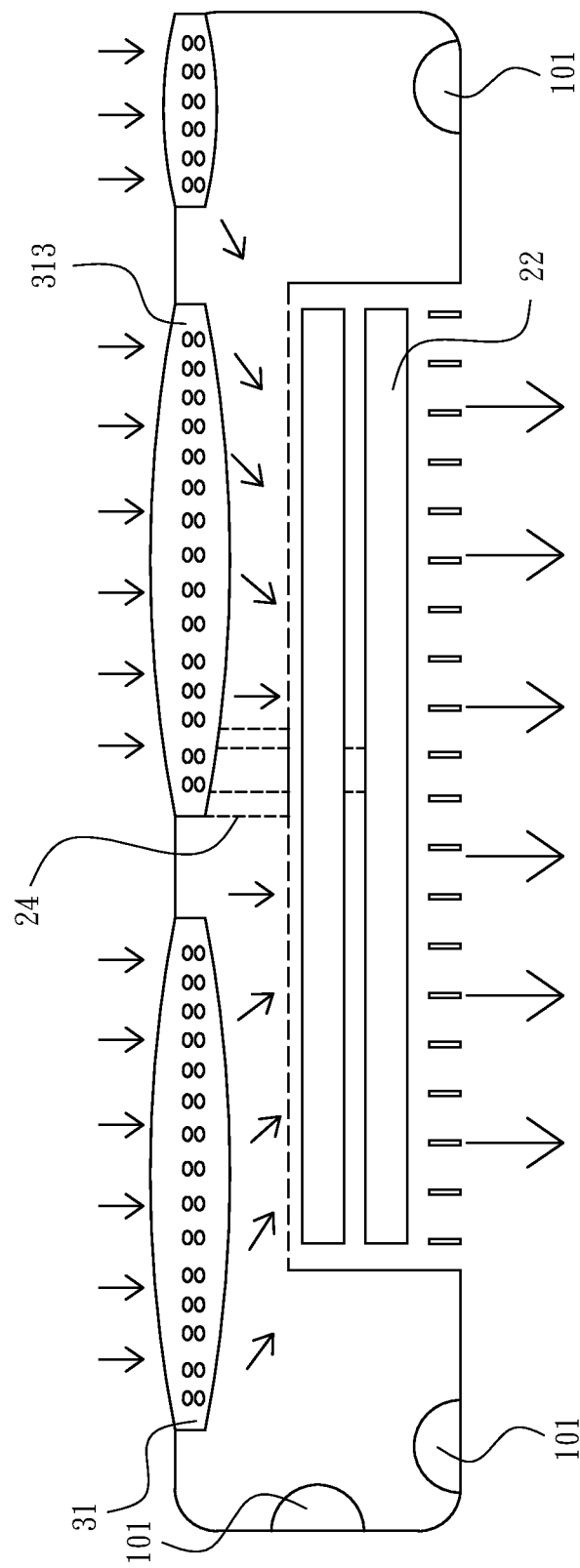
FIG. 8 shows a cross-sectional view of the airflow system.

As shown in FIGS. 7 and 8, the shape and size of the shutter 32 in accordance with the recess 11 which covered the recess 11 at the bottom side of the body 1. The rotor module 22 rotates to inhale the air to the recess from the pore part 313 and exhale the air from the shutter 32 to produce the lifting power to the body 1. And pilot would be able to control the angle of the blades of the shutter 32, and the angle change of the shutter 32 will influence the streamlines of the airflow through the recess 11, then results in the change of the motion of the body 1

In an embodiment, the present invention contains six airfoils 31, which are first right airfoil 31R1, second right airfoil 31R2, first left airfoil 31L1, second left airfoil 31L2, first tail airfoil 31T1, second tail airfoil 31T2. The direction of the pore part 313 determines the direction of the body 1.

Referring to the table 1, the arrows represents the direction of the pore part 313, wherein "↑" represents that the pore part 313 is upward, "→" represents that the pore part 313 is rightward, "←" represents that the pore part 313 is leftward, and "-" represents that the pore part 313 is inward and shut. In an embodiment of the present invention, while the pilot desired to hover, lift or land the aircraft, the pilot could turn the pore part 313 of the airfoils upward by lifting the flying control box 51 upward.

TABLE 1

| Body | 1st R. airfoil | 2nd R. airfoil | 1st L. airfoil | 2nd L. airfoil | 1st T. airfoil | 2nd T. airfoil |
| --- | --- | --- | --- | --- | --- | --- |
| Lifting | ↑ | ↑ | ↑ | ↑ | ↑ | ↑ |
| Forward | → | → | ← | ← | — | — |
| Right Turn | → | → | ↑ | ↑ | — | ↑ |
| Left Turn | ↑ | ↑ | ← | ← | ↑ | — |
| Head up | ↑ | → | ↑ | ← | — | — |
| Head down | → | → | ← | ← | ↑ | ↑ |
| Landing | ↑ | ↑ | ↑ | ↑ | ↑ | ↑ |
| Hovering | ↑ | ↑ | ↑ | ↑ | ↑ | ↑ |

Figure 9A:
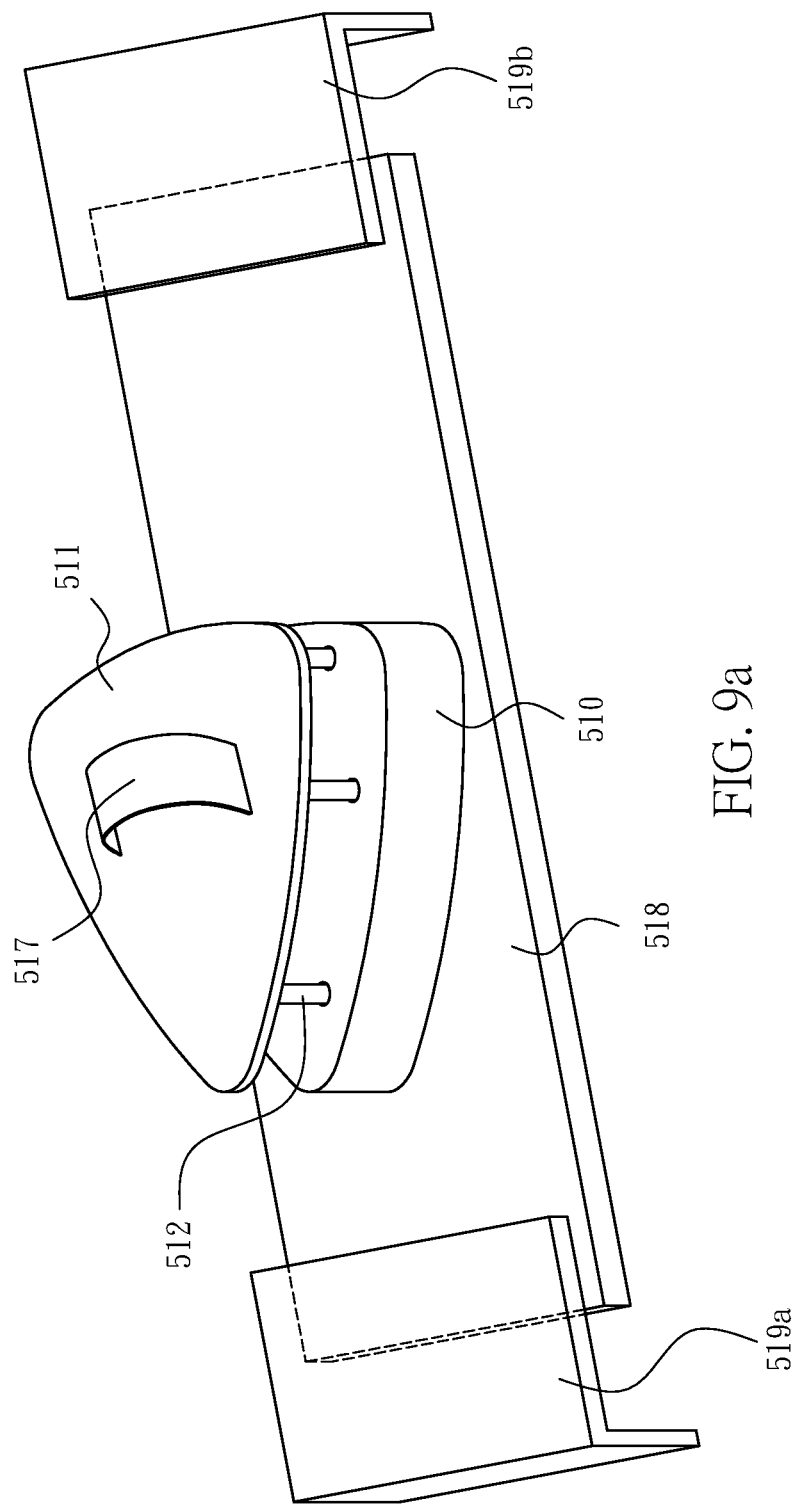
FIG. 9a shows a side view of the fly control box.
Figure 9B:
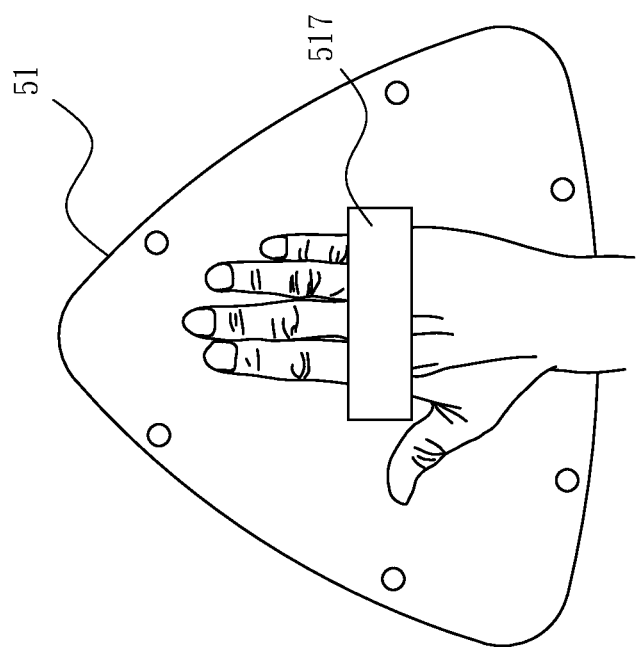
FIG. 9b shows a top view of the fly control box.
Figure 9C:
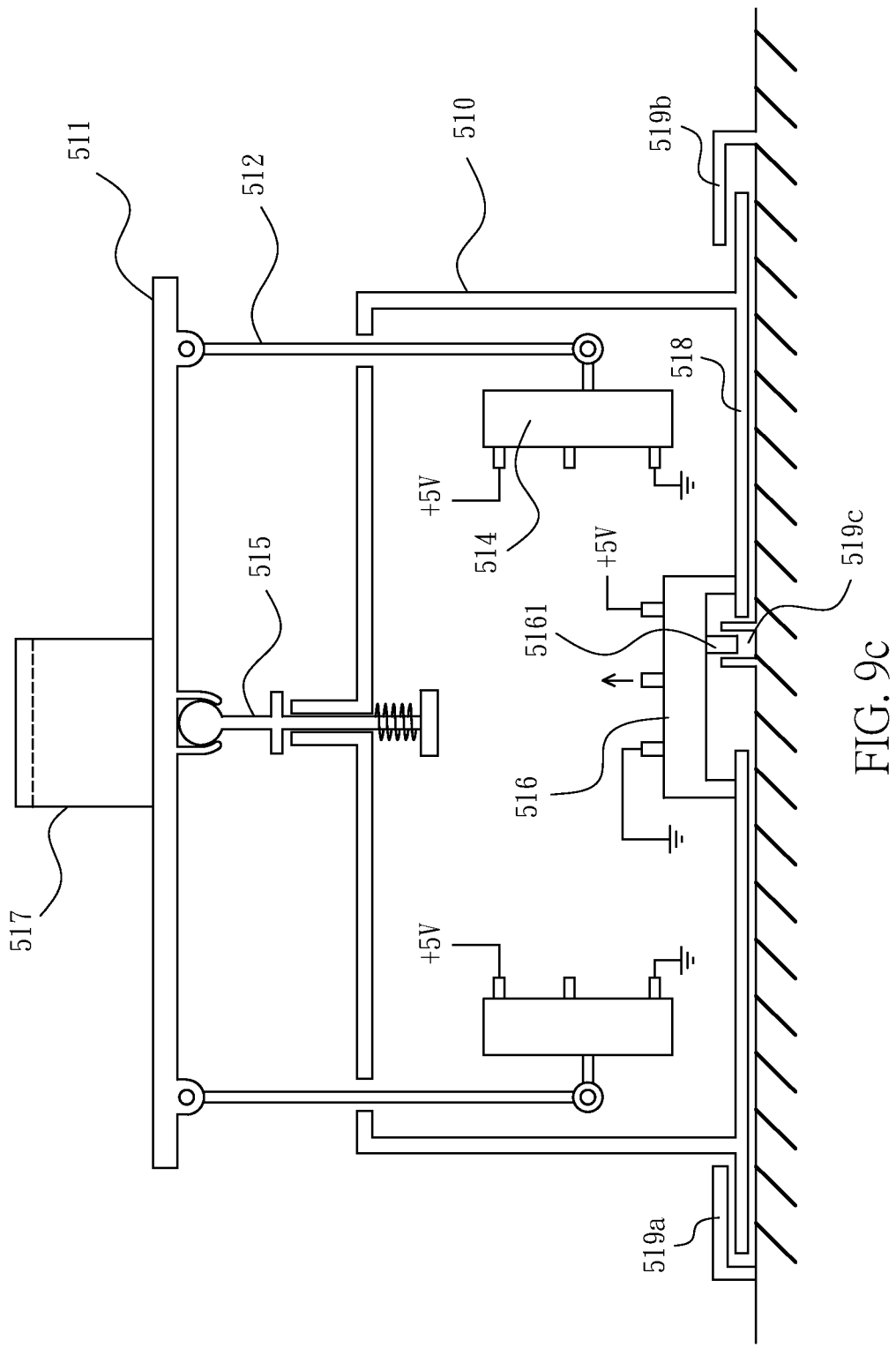
FIG. 9c shows a cross-sectional view of the flying control box.

As shown in FIGS. 9a-9c, the present invention further comprises a flying control box 51 having a shape corresponding to the body 1, in an embodiment; the flying control box 51 is arrowhead in shape. Wherein, the flying control box 51 comprise a handle 511 deployed on the top, and a hand strap 517 deployed at the top of the handle 511 which fasten the pilot's hand to the flying control box 51. Wherein, a slide plate 518 is deployed at the bottom of the flying control box 51 which is deployed inside the mortise 519. The flying control box 51 comprises a box body 510 having a housing space and an airfoil slide resistors 514 which deployed inside the housing space which connected with the handle 511 by a connecter rod 512. Wherein, a stop rod 515 is also deployed in the middle of the handle 511 and the housing space which assist the control of flying control box 51.

As shown in FIG. 9c, a shutter slide resistors 516 deployed at the bottom of the housing space which is connected with the shutter 32. Wherein the mortise 519 further comprises a first groove 519a, second groove 519b and third groove 519c. The sliding range of the slide plate 518 has been limited between the first groove 519a and second groove 519b. Wherein, the shutter slide resistors 516 comprise a sliding shaft 5161, which is deployed inside the third groove 519c. While the slide plate 518 slide between the first groove 519a and second groove 519b, the sliding shaft 5161 will also being slide upon the shutter slide resistors 516. In an embodiment, the pilot could gradually move the flying control box 51 between the first groove 519a and second groove 519b and control the blades' angle of the shutter 32 to change the streamlines of airflow through the recess 11, and changing the aircraft from hovering to flying forward by pushing slide plate 518 forward to the first groove 519a.

Figure 10:
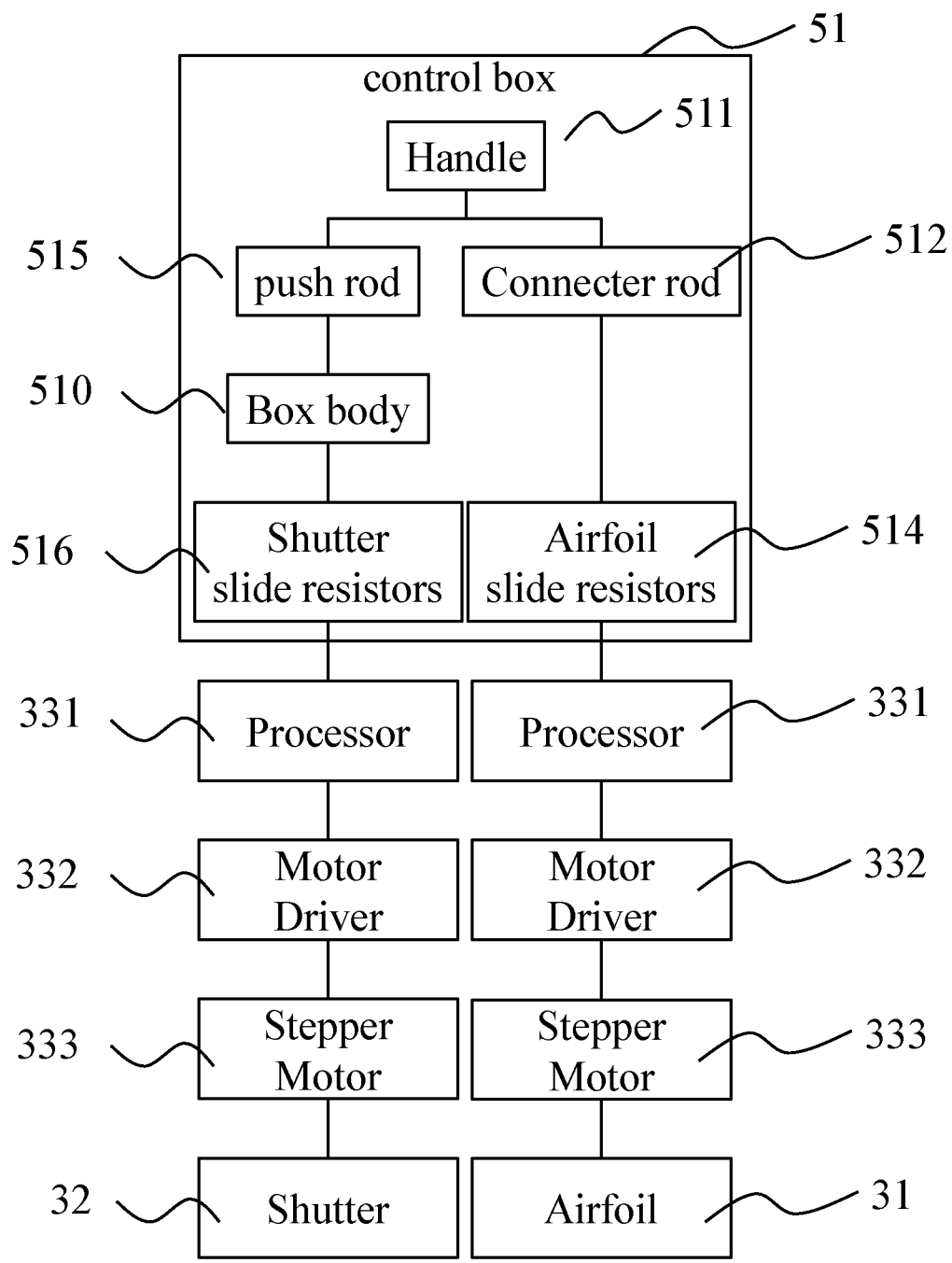
FIG. 10 shows a diagram of the flying control box.

As shown in FIG. 10, airfoil slide resistors 514 is connected with processor 331 which is able to convert the analog signal from the handle 511 into a digital signal, wherein the processor 331 is an Arduino or an equivalent in this embodiment. The processor 331 also connected with a motor driver 332, and the motor driver 332 will drive a stepper motor 333 according to the digital signal, then the stepper motor 333 control the direction of the pore part 313 according to the signal from the flying control box 51.

In the present invention, shutter slide resistors 516 is connected with another processor 331 which is able to convert the analog into the digital signal, wherein the processor 331 is an Arduino or an equivalent in this embodiment. The processor 331 also connected with a motor driver 332, and the motor driver 332 will drive a stepper motor 333 according to the digital signal, then the stepper motor 333 tilt the blades' angle of the shutter 32 according to the signal from the flying control box 51.

Figure 11A:
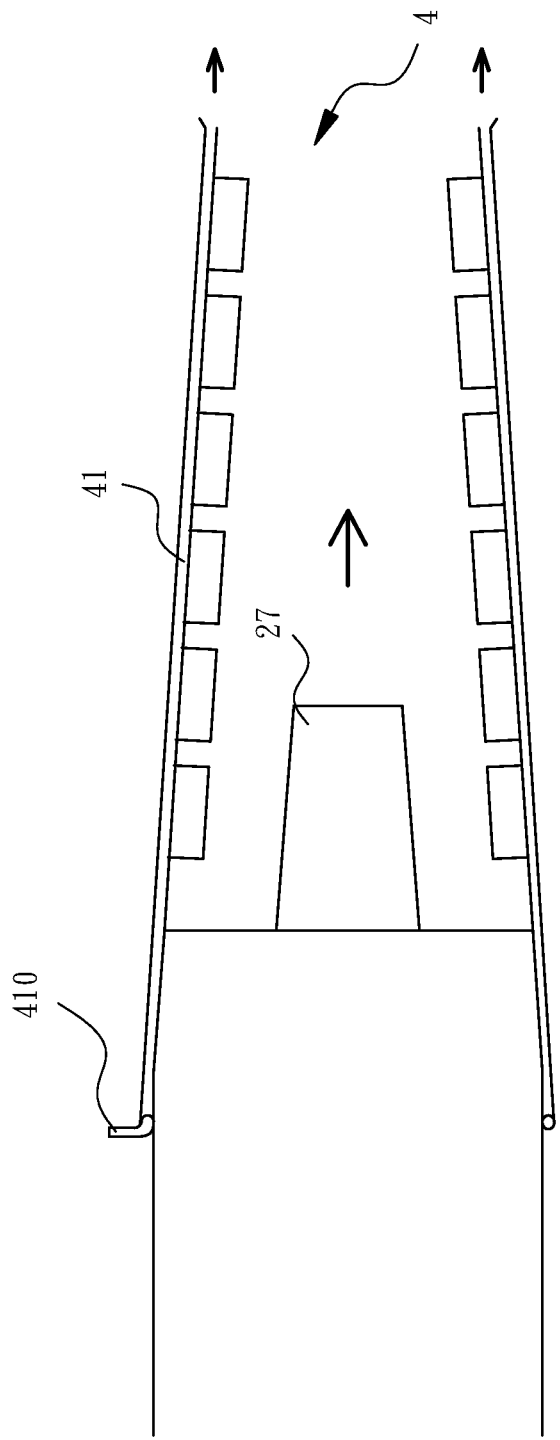
FIG. 11a shows a cross-sectional view of the exhausted module.
Figure 11C:
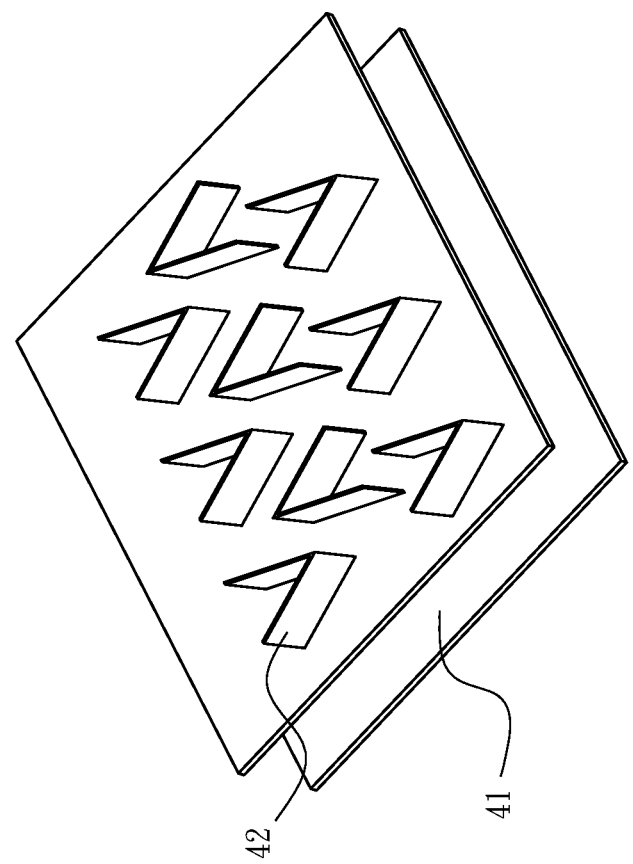
FIG. 11c shows a view of the V-shaped fins.
Figure 11B:
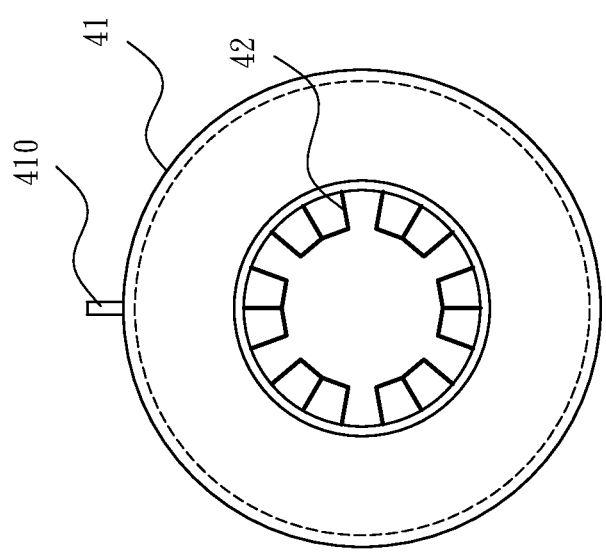
FIG. 11b shows a back view of the exhausted module.

As shown in FIGS. 11a-11c, an exhausted module 4 is installed at the tail of the jet engine, and the exhausted module 4 covered the exhausted end 27, where in the exhausted module 4 is in a shape of cylinder which the end attached to the exhausted end 27 having a bigger diameter than the other end. Besides, the exhausted module 4 comprising a heat recovery module 41 which is a capillary that running deionized water which absorbed the heat from the exhausted end 27 and generated into the steam, and then the steam will be the extra thrust power to enhance the jet force. Besides, there is an inlet 410 deployed at the surface of the heat recovery module 41, and the inlet 410 is configured to allow the water pump to inject the deionized water into the heat recovery module 41.

In the present invention, the exhausted module 4 comprises a plurality of V-shaped fins 42 mounted inside the cylinder, which muffled the sound from the exhausted end 27 to reduce the noise.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An aircraft comprising:
a body which is arrowhead in shape, wherein the body comprises a nose end positioned at the front end of the arrowhead, a tail side positioned at the opposite side of the head end, and a recess positioned at the center of the body;
a propulsion system comprising:
a rotor module deployed at the recess, wherein the rotor module comprises a pair of counter-rotating propellers which are mounted on a vertical shaft, wherein one end of the vertical shaft has a bevel gear module;
a jet engine module deployed at the tail side, wherein the jet engine module comprises a horizon shaft having a first bevel gear unit being connected with the bevel gear module;
an exhausted module deployed around an exhausted end of the jet engine module, wherein the exhausted module comprises a heat recovery module containing deionized water which transform the heat from the exhausted end into thrust power, and the exhausted module having a plurality of V-shaped fins which muffled the noise from the exhausted end;
an airflow system comprising:
a shutter deployed at a bottom side of the body and covered the recess, wherein the shutter comprises a plurality of blades which control the streamlines of airflow through the recess;
a plurality of hollow columns deployed along three lateral sides of the body, wherein the hollow column has a pore part on one side of the hollow column, wherein the pore part has a plurality of pores and the hollow column controls the direction of pore part to control the airflow's direction which forces the aircraft tilted to the desired direction;
a flying control box having a box body which is arrowhead in shape and has a housing space inside the box body, the flying control box comprising:
a handle deployed on the top of the box body, and a hand strap deployed at the top of the handle;
a connecter rod and a stop rod connected with the handle in one end, wherein the stop rod is also connected with the box body;
a slide resistor deployed at the housing space, and connected with the other end of the connecter rod;
a shutter slide resistor deployed at the bottom of the box body, the shutter slide resistor and connected with the shutter.

2. The aircraft as claimed in claim 1, wherein the propulsion system further comprises a motor, a first gear module, and a second gear module, wherein the first gear module is attached with both the motor and the horizon shaft, wherein the second gear module connects with both the motor and the horizon shaft.

3. The aircraft of claim 2, wherein the propulsion system further comprises an ignition module connected with the first gear module.

4. The aircraft as claimed in claim 2, wherein the propulsion system further comprises an engine failure alert connected with the turbo engine and the motor.

5. The aircraft as claimed in claim 1, wherein a diameter of the both ends of the airfoil is narrower than the middle, and the pore part is deployed along the airfoil from one end to the other end, and the other side which opposite to the pore part is an opening.

6. The aircraft as claimed in claim 1, wherein the body comprises a plurality of cavities along the three lateral sides, and the hollow columns are installed inside the cavities.

7. The aircraft as claimed in claim 1, wherein the exhausted module is a cylinder in shape, and deionized water is injected between the walls of the exhausted module, and the V-shaped fins are deployed at the inner walls of the exhausted module.

8. The aircraft as claimed in claim 1, wherein the airflow system further comprises:
a processor connected with the slide resistor, which is configured to convert the analog signal from the handle to a digital signal;
a motor driver connected with the processor which receives the digital signal;
a stepper motor connected with the motor driver and the hollow columns to control the direction of the pore part according to the digital signal.

9. The aircraft as claimed in claim 1, wherein the airflow system further comprises:
a processor connected with the shutter slide resistor, which is configured to convert the analog signal from the handle to a digital signal;
a motor driver connected with the processor which receive the digital signal;
a stepper motor connected with the motor driver and the shutter to control the streamlines of airflow through the recess according to the digital signal.

10. The aircraft as claimed in claim 1, further comprising a cockpit deployed on the top of the body, wherein the flying control box is deployed at the cockpit, and the cockpit further comprises an accelerator and a control panel, wherein the accelerator is connected with the propulsion system which is configured to control the rotational speed of the propulsion system, wherein the control panel which is configured to control electronic units is installed on the body.

11. The aircraft as claimed in claim 10, wherein the electronic units are GPS devices, autopilot devices, camera devices, compasses, ground search lite, air control radio, water tank gauge, fuel tank gauge, speed gauge, radar system, engine failure alert, temperature gauge, altitude gauge, ignition switch or a combination of any two mentioned above.

* * * * *